(12) United States Patent
Olcay et al.

(10) Patent No.: US 10,108,565 B2
(45) Date of Patent: Oct. 23, 2018

(54) METHOD FOR ON-DEMAND FETCHING OF SGL POINTERS BASED BUFFER, TRAFFIC AND COMMAND REQUIREMENTS

(71) Applicant: Toshiba Memory Corporation, Tokyo (JP)

(72) Inventors: Sancar Kunt Olcay, Sunnyvale, CA (US); Dishi Lai, San Jose, CA (US)

(73) Assignee: Toshiba Memory Corporation, Tokyo (JP)

( * ) Notice: Subject to any disclaimer, the term of this patent is extended or adjusted under 35 U.S.C. 154(b) by 671 days.

(21) Appl. No.: 14/674,796

(22) Filed: Mar. 31, 2015

(65) Prior Publication Data

US 2016/0292100 A1 Oct. 6, 2016

(51) Int. Cl.
  *G06F 13/00* (2006.01)
  *G06F 13/28* (2006.01)
(52) U.S. Cl.
  CPC .................... *G06F 13/28* (2013.01)
(58) Field of Classification Search
  CPC ....................................................... G06F 13/28
  See application file for complete search history.

(56) References Cited

U.S. PATENT DOCUMENTS

| 5,390,318 A | 2/1995 | Ramakrishnan et al. |
| 6,163,820 A | 12/2000 | Garrett et al. |
| 7,359,890 B1 | 4/2008 | Ku et al. |
| 8,271,700 B1 * | 9/2012 | Annem ................ G06F 13/28 710/22 |
| 2006/0221875 A1 * | 10/2006 | Trainin ................ H04L 12/56 370/282 |

* cited by examiner

*Primary Examiner* — Zachary K Huson
(74) *Attorney, Agent, or Firm* — Patterson & Sheridan, LLP

(57) ABSTRACT

In an example, a method of fetching direct memory access (DMA) descriptors for commands to a non-volatile semiconductor storage device includes storing the commands among a plurality of queues in a command random access memory (RAM). The method further includes processing one or more of the commands from the plurality of queues and issuing requests to read from or write into the non-volatile semiconductor storage device according to the processing. The method further includes fetching DMA descriptors from the host system for the processed commands according to a real-time fetch quota. The method further includes pre-fetching DMA descriptors from the host system for queued commands that are not being processed according to a pre-fetch quota. The method further includes storing fetched and pre-fetched DMA descriptors in a descriptor RAM.

20 Claims, 7 Drawing Sheets

METHOD FOR ON-DEMAND FETCHING OF SGL POINTERS BASED BUFFER, TRAFFIC AND COMMAND REQUIREMENTS

BACKGROUND

Solid-state drives (SSDs) generally have faster performance, are more compact, and are less sensitive to vibration or physical shock than conventional magnetic disk drives. Given these advantages, SSDs are being used in more and more computing devices and other consumer products in lieu of or in addition to magnetic disk drives, even though the cost-per-gigabyte storage capacity of SSDs is significantly higher than that of magnetic disk drives.

The performance of SSDs is not attributable only to the speed of reading from and writing to memory cells of SSDs, but also the time taken by the SSD controller to process the read and write commands issued by connected host systems. From the perspective of the host system, IO (input-output operation) latency is measured by the time it issues the read or write command to the SSD to the time the SSD responds with read data or a write acknowledgement. If there any delays between those two time periods, including delays attributable to the SSD controller, the host system will experience an increase in latency.

SSD controllers transfer read data and write data to and from the host system using direct memory access (DMA) transfers. DMA is a technique for transferring blocks of data between system memory and peripherals without involving the system processor in each transfer. To avoid setting aside large blocks of memory in the host system, an SSD controller can use a scatter-gather list (SGL) based DMA to transfer read and write data. SGL-based DMA provides data transfers to and from non-contiguous blocks of system memory using a series of contiguous-block transfers. To effectuate DMA transfers, the host system generates DMA descriptors that hold the necessary control information. In SGL based DMA, the number of descriptors needed for a given command to the SSD is unknown. Accordingly, the SSD controller must adequately manage fetching and storing of DMA descriptors to conserve resources, while achieving desired performance and command latency.

SUMMARY

One or embodiments relate to a method of fetching direct memory access (DMA) descriptors for commands to a non-volatile semiconductor storage device. The method includes storing the commands among a plurality of queues in a command random access memory (RAM). The method further includes processing one or more of the commands from the plurality of queues and issuing requests to read from or write into the non-volatile semiconductor storage device according to the processing. The method further includes fetching DMA descriptors from the host system for the processed commands according to a real-time fetch quota. The method further includes pre-fetching DMA descriptors from the host system for queued commands that are not being processed according to a pre-fetch quota. The method further includes storing fetched and pre-fetched DMA descriptors in a descriptor RAM.

One or more embodiments relate to a controller for a non-volatile semiconductor storage device. The controller includes a command random access memory (RAM) configured to store commands received from a host system, a descriptor RAM, and a processing system having a back end and a front end. The front end is configured to store the commands among a plurality of queues in a command random access memory (RAM). The front end is further configured to process one or more of the commands from the plurality of queues and issuing requests to read from or write into the non-volatile semiconductor storage device according to the processing. The front end is further configured to fetch DMA descriptors from the host system for the processed commands according to a real-time fetch quota. The front end is further configured to pre-fetch DMA descriptors from the host system for queued commands that are not being processed according to a pre-fetch quota. The front end is further configured to store fetched and pre-fetched DMA descriptors in the descriptor RAM.

One or more embodiments relate to relate to a non-transitory computer readable medium having instructions thereon that when executed by a processor cause the processor to perform the method recited above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Techniques for on-demand fetching of DMA descriptors for a non-volatile memory storage device are described. The techniques described herein can be used to manage DMA descriptors contained in scatter-gather lists (SGL) for SGL-based DMA operation. In SGL operation, the number of descriptors for a given command is unknown and there can be hundreds of active commands requiring DMA descriptors. The techniques described herein balance DMA descriptor fetch requests based on various factors, including: descriptor pre-fetch quotas, real-time fetch quotas for active commands, port quotas, the number of active write commands, the number of active DMA fetch requests, DMA descriptor buffer availability, DMA transfer buffer availability, the number of active DMA fetch requests versus pre-fetch requests, among other factors. The techniques described herein reduce buffer requirements and minimize performance degradation and command latency.

Figure 1:
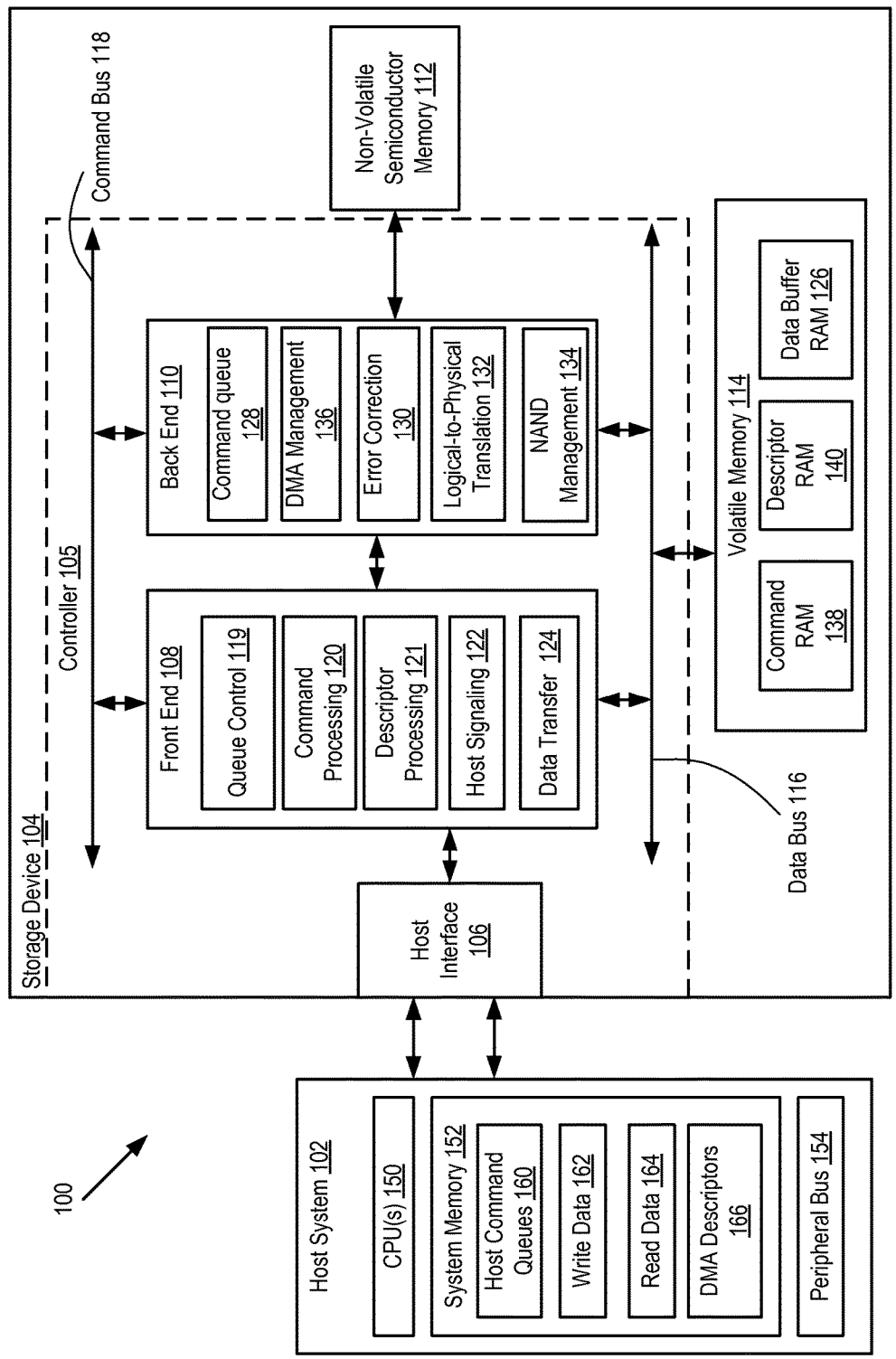
FIG. 1 is a block diagram showing an example of a computing system including a storage device in communication with a host system.

FIG. 1 is a block diagram showing an example of a computing system 100 including a storage device 104 in communication with a host system 102. Host system 102 is a computing system that comprises one or more central processor units (CPUs) 150, a system memory 152, a peripheral bus 154, and other components as is generally known. CPUs 150 can include any type of microprocessor(s) known in the art. System memory 152 may include, for example, random access memory (RAM), read only memory (ROM), or a combination thereof. Peripheral bus 154 can be any type of computer bus interface, such as a peripheral component interconnect express (PCIe) bus, serial advanced technology attachment (SATA) bus, or the like. Storage device 104 provides non-volatile storage functionality for use by host system 102. Storage device 104 can be a solid-state drive ("SSD"), which is a non-volatile storage device that includes non-volatile semiconductor-based storage elements, such as NAND-based flash memory, as the storage medium (as opposed to, for example, the magnetic medium used in hard disk drives).

Storage device 104 includes an SSD controller 105, volatile memory 114, and non-volatile semiconductor memory 112. Storage device 104 may also include other elements not shown, such as power supply circuitry (including circuitry for transferring power to the SSD controller 105, volatile memory 114, and non-volatile semiconductor memory 112, as well as capacitors for buffering the power supply), indicator light circuitry, temperature sensors, boot circuitry, clock circuitry, and other circuitry for assisting with various functions.

SSD controller 105 receives and processes commands from host system 102 in order to perform operations on the non-volatile semiconductor memory 112. Commands from host system 102 include requests to read or write to locations within the non-volatile semiconductor memory 112, and various administrative commands, such as commands for querying the feature set of storage device 104, commands for formatting non-volatile memory 112, commands for creating and modifying various types of queues, commands for requesting notification of various events, and various other commands. SSD controller 105 includes a host interface 106, a front end 108, a back end 110, a command bus 118, and a data bus 116.

Host interface 106 comprises circuitry for communicating with host system 102. In one embodiment, host interface 106 is coupled to peripheral bus 154 in host system 102 through one or more ports (e.g., two ports are shown). For example, host interface 106 can be a PCIe interface that communicates according to the PCIe standard, and SSD controller 105 can comply with the non-volatile memory host controller interface specification (NVMHCI) referred to as "NVM express" or "NVMe." In another embodiment, the interface is a SATA interface.

Front end 108 communicates with host system 102 to fetch, organize, and forward commands from host system 102 to back end 110. Host system 102 can maintain host command queues 160, such as one or more submission queues and one or more completion queues. Front end 108 can fetch commands from submission queues in host system 102. Front end 108 also forwards status data from back end 110 to host system 102, such as command completion data. Front end 108 can provide command completion data to completion queues in host system 102.

Back end 110 performs tasks associated with commands received from front end 108, accessing non-volatile semiconductor memory 112 as needed in accordance with these tasks. Back end 110 employs direct memory access (DMA) to store and retrieve data from system memory 152 of host system 102. For example, back end 110 can transfer data that has been read from non-volatile semiconductor memory 112 to system memory 152 using DMA ("read data 164"). Back end 110 can transfer data to be written to non-volatile semiconductor memory 112 from system memory 152 using DMA ("write data 162"). In an embodiment, read data 164 and write data 162 are stored in non-contiguous areas of system memory 152, and back end 110 employs SGL-based DMA to write read data 164 to system memory 152, and retrieve write data 162 from system memory 152.

Both front end 108 and back end 110 are coupled to a command bus 118 and a data bus 116. Command bus 118 functions to transfer command-related data between various sub-units of front end 108 and back end 110, and data bus 116 serves to transfer data between volatile memory 114 and various sub-units of front end 108 and back end 110. Volatile memory 114 can include one or more types of RAM, such as static RAM (SRAM), dynamic RAM (DRAM), or the like.

Volatile memory 114 can include RAM modules or specific regions of RAM dedicated to storing particular types of data. In an embodiment, volatile memory 114 includes command RAM 138 configured to store commands received from host system 102, descriptor RAM 140 configured to store DMA descriptors (also referred to herein as "descriptors") received from host system 102. Data buffer RAM 126 configures a read cache and a write cache. A read cache temporarily stores data read from non-volatile semiconductor memory 112 ("read data") in response to a command from host system 102. A write cache temporarily stores data to be written to non-volatile semiconductor memory 112 ("write data") in response to a command from host system 102.

While command RAM 138, descriptor RAM 140, and data buffer RAM 126 are shown as being part of a single group of volatile memory coupled to data bus 116, other configurations are possible. For example, command RAM 138 and descriptor RAM 140 can be part of a group of volatile memory only coupled to front end 108, and data buffer RAM 126 can be part of a group of volatile memory only coupled to back end 110. In such an example, front end 108 can forward command and descriptor data to back end 110 over a bus (e.g., command bus 118 or data bus 116) or by a direct link to back end 110, rather than back end 110 having direct access to command and descriptor data in volatile memory 114.

Non-volatile semiconductor memory 112 stores data in a non-volatile manner at the request of host system 102. Non-volatile semiconductor memory 112 includes one or more arrays of non-volatile semiconductor-based storage elements, some examples of which include non-volatile NAND flash memory, non-volatile NOR flash memory, non-volatile DRAM based memory, magnetoresistive random-access memory (MRAM), and other types of memory. As NAND-based flash memory is commonly used as the non-volatile semiconductor memory 112, non-volatile semiconductor memory 112 may be referred to herein as NAND memory 112 or simply as NAND 112.

Front end 108 includes multiple functional units, including queuing control unit 119, command processing unit 120, descriptor processing unit 121, host signaling unit 122, and data transfer unit 124. Command processing unit 120 fetches commands from host system 102. Command processing unit 120 provides the commands to queuing control unit 119. Queuing control unit 119 stores the commands in command RAM 138. Queuing control unit 119 implements command load balancing to select eligible commands to be performed by back end 110. Command processing unit 120 forwards commands selected by queuing control unit 119 to back end 110 for processing. Command processing unit 120 can also perform various operations on commands, such as command checks. Command processing unit 120 also receives status information for the commands from back end 110. Descriptor processing unit 121 fetches DMA descriptors 166 from system memory 152 associated with the commands. DMA descriptors 166 point to addresses in system memory 152 for write data 162 and read data 164. In an embodiment, DMA descriptors 166 are organized into scatter-gather list (SGL) segments for SGL-based DMA transfer. Descriptor processing unit 121 stores fetched descriptors for the commands in descriptor RAM 140.

Host signaling unit 122 can transmit command status information obtained from command processing unit 120 to host system 102. Host signaling unit 122 generates host notification signals and transmits these signals to host system 102. These signals may be used to indicate that one or more commands fetched from host system 102 are complete. Host notification signals include interrupts and may be out-of-band, pin-based interrupts, or may be in-band message signaled interrupts ("MSI" or "MSIx"). The interrupts include data identifying the command that has been completed as well as status data associated with that command. Host signaling unit 122 includes an interrupt table that includes such information, as well as an interrupt generator which generates interrupts for transmission to host system 102, based on the information stored in the interrupt table.

Data transfer unit 124 serves as an intermediary between host interface 106 and the sub-units of front end 108 (e.g., queue control unit 119, command processing unit 120, and descriptor processing unit 121). Data transfer unit 124 directs data received from host interface 106 to the appropriate sub-unit (e.g., command data to command processing unit 120 and descriptor data to descriptor processing unit 121).

Back end 110 includes multiple functional units, including a command queue 128, an error correction unit 130, a logical-to-physical address translation unit 132, a NAND management unit 134, and DMA management unit 136. Command queue 128 stores commands received from front end 108 for further processing. Buffering commands in this manner allows back end 110 to process received commands based on a particular schedule or on specific timing or state-based constraints. Error correction unit 130 provides error correction functionality for data stored in non-volatile semiconductor memory 112. Error correction unit 130 generates error-correction data for data written to the non-volatile semiconductor memory 112 and stores the error-correction data with the written data. When the written data is read out and error in reading is encountered, error correction unit 130 performs error correction operations using the error-correction data.

Logical-to-physical translation unit 132 translates logical addresses, e.g., logical block addresses (LBAs), to physical addresses, e.g., physical block addresses, of non-volatile semiconductor memory 112 during reading or writing data. Logical-to-physical translation unit 132 accesses a map, known as a flash translation layer (FTL), when converting logical addresses to physical addresses so that data requested by host system 102 with a logical address can be properly physically addressed within non-volatile semiconductor memory 112.

NAND management unit 134 is configured to write data to non-volatile semiconductor memory 112 and read data from non-volatile semiconductor memory 112. NAND management unit 134 stores data read from non-volatile semiconductor memory 112 in a read cache in data buffer RAM 126. NAND management unit 134 receives data to be written to non-volatile semiconductor memory 112 from a write cache in data buffer RAM 126. NAND management unit 134 may also provide other functions, such as wear leveling, bad block mapping, garbage collection, and read scrubbing.

Wear leveling is a technique to compensate for the fact that a (relatively) limited number of write operations can be performed on each NAND data storage element, commonly referred to as a block. Wear leveling comprises periodically moving data between NAND data storage blocks in order to even out or "level" the number of times write operations are performed for each data storage block. Bad block mapping is a technique for marking blocks as being "bad" after it is discovered that such blocks are unreliable. Blocks marked as bad are not written to or read from.

Garbage collection is a technique whereby valid pages (a subunit of a block) within a block are copied to a new block so that the source block can be erased. Garbage collection is needed in NAND memory because the unit of writing is a page and the unit of erasure is a block. Accordingly, if a command to write data targets an existing page, then the data of the existing page is not actually modified. Instead, a new page is written and the old page is marked as invalid. As a result, the number of invalid pages continue to grow and garbage collection becomes necessary to free up blocks having a large number of invalid pages.

Read scrubbing is a technique whereby SSD controller 105 periodically reads data in the non-volatile semiconductor memory 112, performs error checking operations on the data to determine if there are errors, corrects errors that are found, and then writes the error-corrected data back to the same location. This technique helps to reduce the amount of errors experienced when reading data out from the non-volatile semiconductor memory 112.

DMA management unit 136 is configured to control DMA transfer of data between SSD controller 105 and system memory 152 in host system 102. DMA management unit 136 uses DMA descriptors fetched by front end 108, which point to read and write buffers in system memory 152. DMA management unit 136 transfers data from a read cache in data buffer RAM 126 to system memory 152 using corresponding DMA descriptors associated with a corresponding read command. DMA management unit 136 transfers data to write cache in data buffer RAM 126 from system memory 152 using corresponding DMA descriptors associated with a corresponding write command.

In various embodiments, the functional blocks included in front end 108 and back end 110 represent hardware or combined software and hardware elements for performing associated functionality. Thus, any or all of the functional blocks may be embodied as firmware executing in a processing unit, as hardware units that are hard-wired to perform the associated functionality, or as a combination thereof. For example, either or both of front end 108 or back end 110 may include one or more processors, one or more state machines, one or more application specific integrated circuits (ASICs), one or more programmable integrated circuits, or the like, that are programmed or configured to perform functions related to the functional blocks. Alternatively, a single processor may be shared between and thus may perform the functions of both front end 108 and back end 110.

Certain functional blocks and functionality associated therewith that are depicted as being included within front end 108 or back end 110 may be implemented as data structures stored within volatile memory 114. Thus, for example, queues indicated as being included in front end 108 and back end 110, may be stored within volatile memory 114. While specific functional units are shown in front end 108 and back end 110, other configurations of functional units can be used to implement the functionality described herein. In general, front end 108 and back end 110 can include one or more functional units that perform the functionality described herein.

In various examples described herein, front end 108 and functions thereof are described as being part of SSD controller 105 in storage device 104. In another embodiment, front end 108 can be separate from SSD controller 105 and/or separate from storage device 104. For example, front end 108 can be part of a controller external to storage device 104. In another embodiment, front end 108 can be implemented by host system 102. For example, the functions performed by front end 108 described above can be implemented in software executed by CPUs 150 in host system 102. Command RAM 138 and descriptor RAM 140 can be part of system memory 152. In such an embodiment, front end 108 is omitted from SSD controller 105 in storage device 104. In still another embodiment, functions of front end 108 can be divided between host system 102 and controller 105 in storage device 104.

Figure 2:
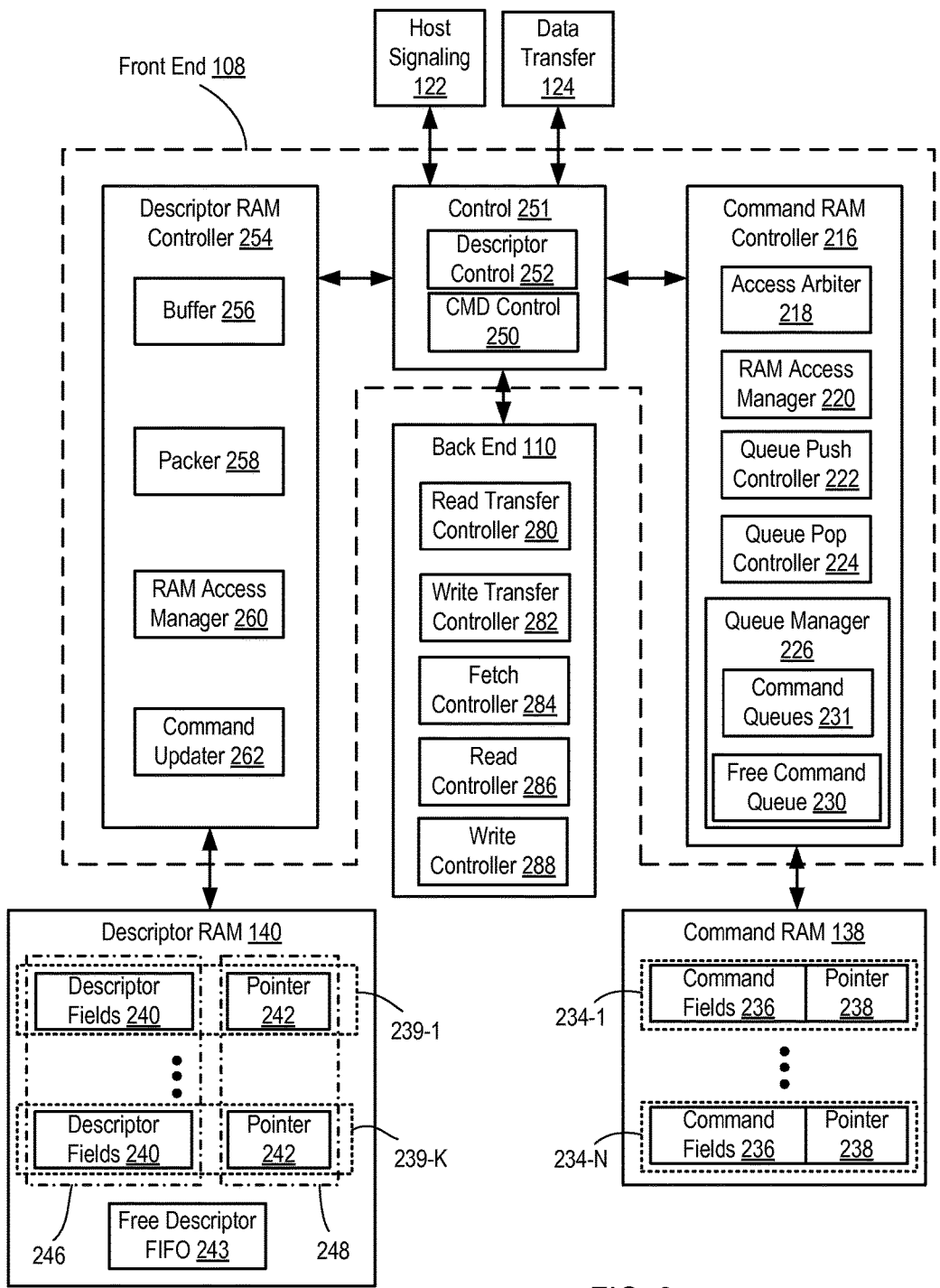
FIG. 2 is a block diagram showing an example front end in more detail.

FIG. 2 is a block diagram showing an example front end 108 in more detail. FIG. 2 shows more detail for the functions of queuing control unit 119, command processing 120, and descriptor processing 121. Front end 108 includes a control unit 251 coupled to a command RAM controller 216 and a descriptor RAM controller 254. Control unit 251 is also coupled to back end 110. Control unit 251 includes a command control unit 250 and a descriptor control unit 252. Command RAM controller 216 is coupled to command RAM 138. Descriptor RAM controller 254 is coupled to descriptor RAM 140.

Back end 110 includes a read transfer controller 280, a write transfer controller 282, a fetch controller 284, a read controller 286, and a write controller 288. Read transfer controller 280 is configured to perform DMA transfer of read data to host system 102 using DMA descriptors stored in descriptor RAM 140. Write transfer controller 282 is configured to perform DMA transfer of write data from host system 102 using DMA descriptors stored in descriptor RAM 140. In an embodiment, each read operation is a two-phase operation of fetching data from non-volatile semiconductor memory 112 and transferring data from non-volatile semiconductor memory 112. Fetch controller 284 is configured to fetch data from non-volatile semiconductor memory 112 in response to a read command. Read controller 286 is configured to transfer data from non-volatile semiconductor memory 112 in response to a read command. Write controller 288 is configured to write data to non-volatile semiconductor memory 112 in response to a write command.

Command control unit 250 is configured to fetch commands from host system 102 (e.g., through data transfer unit 124) and to pass the commands to command RAM controller 216. Alternatively, command control unit 250 can fetch commands from host system 102, and command RAM controller 216 can receive the commands from host system 102 (e.g., through data transfer unit 124). Command control unit 250 can perform one or more operations on the commands, such as various command check operations. Command control unit 250 is further configured to obtain active commands from command RAM controller 216 and issue active commands to back end 110 for processing. Command control unit 250 is further configured to obtain command status from back end 110.

Command RAM controller 216 is configured to receive commands from command control unit 250 or from data transfer unit 124. Command RAM controller 216 is further configured to store the commands in command RAM 138. Command RAM controller 216 is further configured to manage a plurality of queues of commands ("command queues 231"). Command RAM controller 216 is further configured to enqueue or "push" commands into specific command queues, and dequeue or "pop" commands from specific command queues. Command RAM controller 216 is further configured to arbitrate selection among the command queues. In an example, command RAM controller 216 performs such functions using an access arbiter unit 218, a RAM access manager unit 220, a queue push controller unit 222, a queue pop controller unit 224, and a queue manager unit 226.

Descriptor control unit 252 is configured to fetch DMA descriptors from host system 102. The fetched DMA descriptors can include both data descriptors and metadata descriptors. Data descriptors point to read and write buffers in host system 102. Metadata descriptors point to read and write metadata buffers in host system 102, each of which can store various information associated with the read/write data (e.g., parity data for cyclic redundancy check (CRC)). Descriptor control unit 252 is configured to receive DMA descriptors from host system 102 (e.g., through data transfer unit 124) and to pass the DMA descriptors to descriptor RAM controller 254. Alternatively, descriptor control unit 252 can fetch DMA descriptors from host system 102, and descriptor RAM controller 254 can receive the DMA descriptors from host system 102 (e.g., through data transfer unit 124). Descriptor control unit 252 is configured to manage DMA descriptor fetching for commands according to dynamic quotas, as described further below.

Descriptor RAM controller 254 is configured to receive descriptors from descriptor control unit 252 or from data transfer unit 124. Descriptor RAM controller 254 is further configured to store the descriptors in descriptor RAM 140. Descriptor RAM controller 254 is configured to buffer the DMA descriptors and pack them into words in descriptor RAM 140. Descriptor RAM controller 254 is configured to update commands in the command RAM 138 to associate the commands with fetched DMA descriptors stored in the descriptor RAM 140. Descriptor RAM controller 254 is configured to establish dynamic descriptor lists for commands in command RAM 138. In an example, descriptor RAM controller 254 performs such functions using a buffer unit 256, a packer unit 258, a RAM access manager unit 260, and a command updater unit 262.

In operation, command control unit 250 fetches input commands and obtains a command ID for each input command from command RAM controller 216. Queue manager 226 maintains various queues, including command queues 231 and a free command queue 230. Free command queue 230 stores free (unused) command IDs that can be assigned to input commands. Command RAM 138 includes space to store a particular number of commands. In an embodiment, command RAM 138 can store N words 234-1 through 234-N (collectively referred to as "command words 234" or generally referred to as "a command word 234"). A command can be stored in a command word 234. In an embodiment, a command word 234 comprises command fields 236 for a command and a pointer 238. Command fields 236 include various data associated with a command, as described below. Pointer 238 can store an address in command RAM 138 to another command word 234, as described below. In an embodiment, command RAM controller 216 supports N command IDs, where each command ID comprises an address of a command word 234 in command RAM 138.

Command queues 231 can include various queue hierarchies. Command control unit 150 and command RAM controller 216 can cooperate to queue commands in command queues 231 for command load balancing. For example, command queues 231 can include queues based on command origination (e.g., port, function, host queue ID), command destination (e.g., namespace), command type (e.g., read, write, large read, large write), or a combination thereof. Queue push controller 222 enqueues or "pushes" commands into command queues 231, and queue pop controller 224 dequeues or "pops" commands from command queues 231. RAM access manager 220 is configured to write commands to, and read commands from, command RAM 138. Access arbiter 218 is configured to select commands from command queues 231 for command processing, further queue assignment, and command issuance to back end 110. Throughout operation, some commands in command RAM 138 may be queued and waiting for back end processing ("queued commands"), while other commands may be active and issued for back end processing ("active commands").

In an embodiment, command queues 231 can be implemented using linked-lists of commands. Thus, each of command queues 231 can be specified by a head pointer and a tail pointer. Within a given command queue, pointer 238 is used to link one command word 234 to another command word 234.

Descriptor control unit 252 manages fetching of descriptors for the commands in command RAM 138, and descriptor RAM controller 254 manages storage of descriptors in descriptor RAM 140 for the commands in command RAM 138. In an embodiment, the descriptors comprise descriptors in an SGL. For SGL operation, the number of descriptors needed for a given command is unknown. Descriptor control unit 252 minimizes buffer requirements and reduces command latencies by intelligently fetching descriptors from host system 102 for particular commands based on dynamic quotas. Operation of descriptor control unit 252 is described below with respect to FIG. 4.

Descriptor RAM controller 254 dynamically allocates memory in descriptor RAM 140 to hold DMA descriptors for commands. In particular, descriptor RAM 140 includes space to store a particular number of descriptors. Descriptor RAM 140 is configured to store K words 239-1 through 239-K (collectively referred to as "descriptor words 239" or generally referred to as "descriptor word 239"). Each descriptor word 239 can store one or more DMA descriptors for a command. In an embodiment, a descriptor word 239 comprises descriptor fields 240 for DMA descriptor(s) and a pointer 242. Descriptor fields 240 include various data associated with DMA descriptor(s), as described below. Pointer 242 can store an address in descriptor RAM 140 to another descriptor word 239. In an embodiment, descriptor RAM 140 supports K descriptor word IDs, where each descriptor word ID comprises an address of a descriptor word 239 in descriptor RAM 140. Descriptor RAM 140 can store a free descriptor first-in-first-out (FIFO) 243 that stores free descriptor word IDs.

In an embodiment, pointer 242 for each descriptor word 239 is stored in a separate memory module or separate address space than the remaining portion of each descriptor word 239. That is, pointer 242 can be separately addressable from the remaining portion of descriptor word 239. In this manner, descriptor RAM controller 254 can update pointer 242 without performing a read/modify/write operation for the respective descriptor word 239. Thus, descriptor words 239 can include a first addressable portion 246 comprising descriptor fields 240, and a second addressable portion 248 comprising pointers 242.

Commands in command RAM 138 can be associated with dynamic descriptor lists (also referred to as descriptor lists). In an embodiment, descriptor lists for commands can be implemented using linked-lists of descriptor words 239 in descriptor RAM 140. Thus, a descriptor list for a command can be specified by a head pointer and a tail pointer. In each descriptor list, pointer 242 is used to link one descriptor word 239 to another descriptor word 239. Commands can be associated with both data descriptor lists and metadata descriptor lists, as discussed in FIG. 3 below.

Buffer unit 256 in descriptor RAM controller 254 stores descriptors fetched by descriptor control unit 252 for specified command IDs. Command updater unit 262 accesses commands in command RAM 138 based on the specified command IDs, and updates command fields 236 to associate fetched DMA descriptors with commands. In some embodiments, each descriptor word 239 can store a plurality of descriptors for a command. Packer unit 258 can ensure that partially filed descriptor words 239 for a given command are filled with newly fetched descriptors before obtaining a free descriptor word from free descriptor FIFO 243. RAM access manager 260 can write data to, and read data from, descriptor RAM 140. In an embodiment, RAM access manager 260 can also write data to, and read data from, command RAM 138. Alternatively, command updater 262 can communicate with command RAM controller 216 to obtain and update commands.

Figure 3:
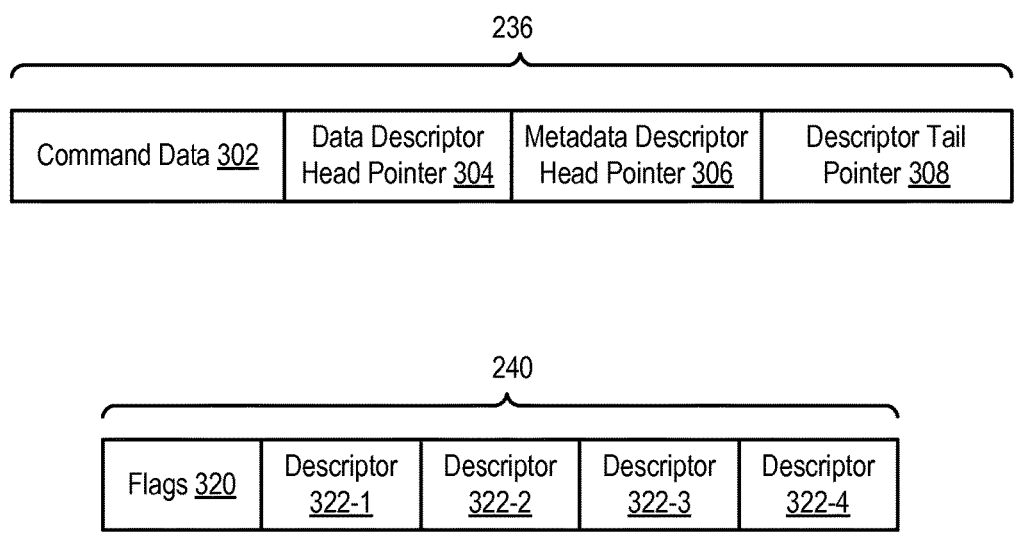
FIG. 3 is a block diagram illustrating the structure of command and descriptor fields according to an embodiment.

FIG. 3 is a block diagram illustrating the structure of command and descriptor fields according to an embodiment. Command fields 236 in each command word 234 comprise command data 302, data descriptor head pointer 304, metadata descriptor head pointer 306, and descriptor tail pointer 308. Command data 302 includes data associated with the given command, such as a command identifier, a DMA type field specifying the type of DMA transfer, an opcode field specifying the type of operation, and a namespace identifier. In SGL operation, command data 302 includes data for an SGL segment in an SGL segment list ("SGL segment data"). In general, an SGL segment includes an area in system memory 152 having one or more DMA descriptors and a pointer to a next SGL segment. The SGL segment data in command data 302 can include a pointer to an SGL segment and a number of DMA descriptors to be read from the SGL segment. Command data 302 can include separate SGL segment data for data and metadata DMA descriptors.

Data descriptor head pointer 304 is a pointer to a first descriptor word 239 in descriptor RAM 140 having data descriptor(s) for the command. Metadata head pointer 306 is a pointer to a first descriptor word 239 in descriptor RAM 140 having metadata descriptor(s) for the command. Descriptor tail pointer 308 is a pointer to a last descriptor word 239 in descriptor RAM 140 having descriptor data for the command. Together, the data descriptor head pointer 304, the metadata descriptor head pointer 306, and the descriptor tail pointer 308 define a data and metadata descriptor lists for the command. Each descriptor list is linked using pointers 242 in descriptor words 239.

Descriptor fields 240 comprise flags 320 and descriptors 322-1 through 322-4 (collectively descriptors 322).

Although four descriptors 322 are shown in the example, descriptor fields 240 can store more or less descriptors. Descriptor fields 240 can store data or metadata descriptors. A given DMA descriptor generally includes source and destination buses and address information, the amount of data to be transferred, maximum burst size, addressing modes, bus sizes, transaction types, and the like known in the art. Flags 320 can be used to identify which of descriptors 322 is a data descriptor or metadata descriptor, which of descriptors 322 has been consumed, which of descriptors 322 is valid, and like type status information associated with descriptors 322.

Figure 4:
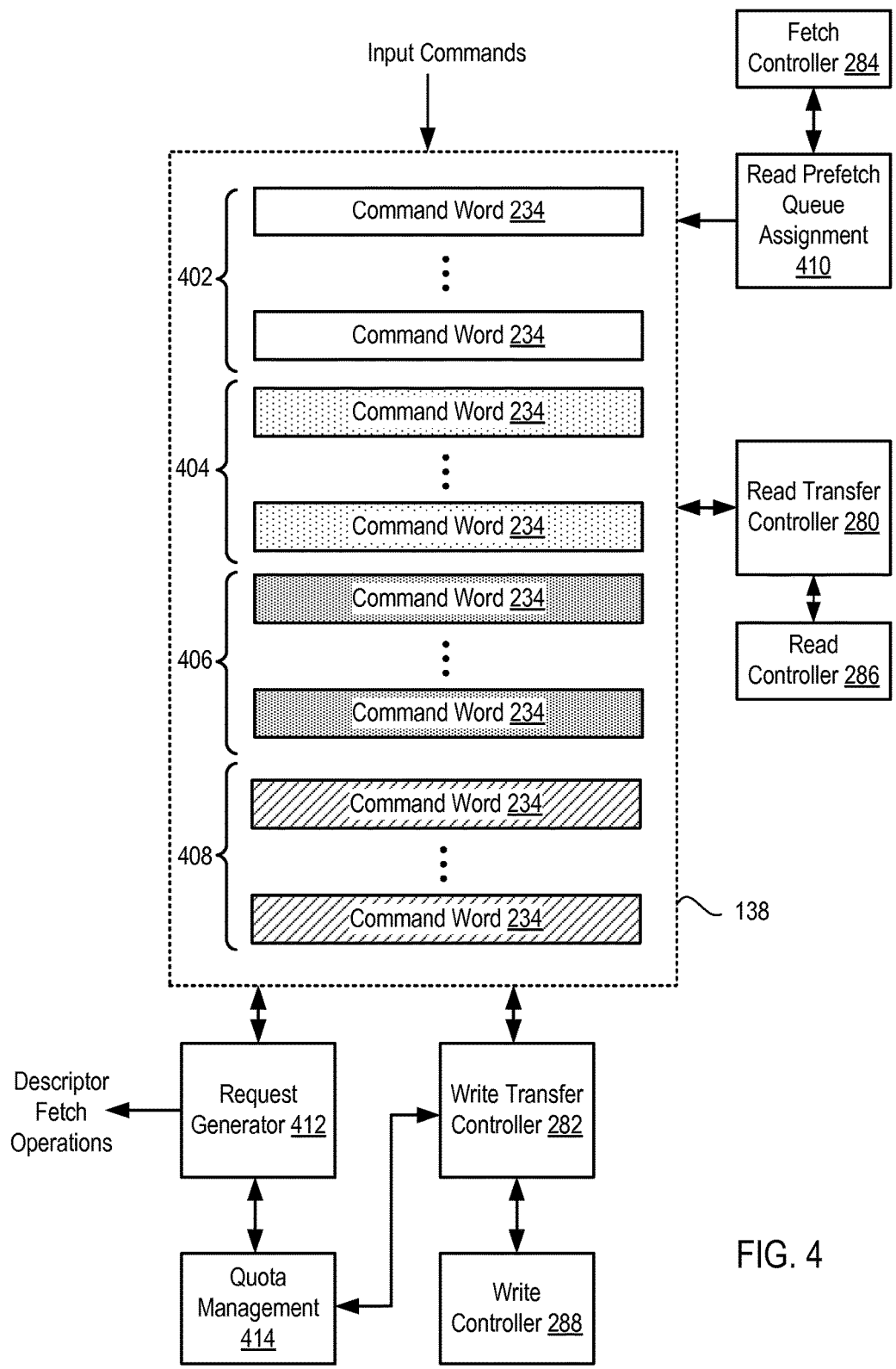
FIG. 4 is a block diagram illustrating an example of DMA descriptor fetching and control flow in the front end of FIG. 2.

FIG. 4 is a block diagram illustrating an example of DMA descriptor fetching and control flow in front end 108. As described above, input commands are stored in command RAM 138. In the example, command RAM 138 stores queued write commands 402, active write commands 404, active read commands 406, and queued read commands 408. Queued write commands 402 include one or more write commands stored in command queues 231 of front end 108 and waiting to be issued to back end 110 for processing. Active write commands 404 include one or more write commands that have been issued to back end 110 for processing. Write transfer controller 282 performs one or more DMA transfers to obtain write data from host system 102 using DMA descriptors in descriptor RAM 140 for active write commands 404. Write controller 288 stores write data in non-volatile semiconductor memory 112.

Active read commands 406 include one or more read commands that have been issued to back end 110 for processing. Reading from non-volatile semiconductor memory 112 typically takes longer to perform than writing to non-volatile semiconductor memory 112 and thus a read command typically invokes a two-phase read operation having a fetch phase and a data transfer phase. Thus, active read commands 406 include active read commands for which data has yet to be fetched, and active read commands for which data has been fetched. Fetch controller 284 fetches read data from non-volatile semiconductor memory 112 for active read commands. A read pre-fetch queue assignment unit 410 assigns read commands back to command queues 231 after fetch controller 284 has completed fetch operations. As such, queued read commands 408 can include one or more read commands stored in command queues 231 of front end 108 and waiting for data transfer. Read transfer controller 280 performs one or more DMA transfers to store read data to host system 102 using DMA descriptors in descriptor RAM 140 for active read commands 404. Read controller 286 obtains the fetched read data from the non-volatile semiconductor memory 112.

Descriptor control unit 252 includes a descriptor fetch unit 412 and a quota management unit 414. Descriptor fetch unit 412 selects commands stored in command RAM 138 for which to obtain DMA descriptors according to criteria established by quota management unit 414. Descriptor fetch unit 412 initiates descriptor fetch operations for the selected commands. Descriptor fetch unit 412 can fetch DMA descriptors for data, metadata, or both. Descriptor fetch operations can be of two different types: fetch operations for active commands (also referred to as "active-transfer fetch operations") versus pre-fetch operations for queued commands.

In an embodiment, quota management unit 414 maintains a real-time fetch quota and a pre-fetch quota. Descriptor control unit 252 fetches DMA descriptors from host system 102 for the active commands according to the real-time fetch quota. Descriptor control unit 252 pre-fetches DMA descriptors from the host system for queued commands according to the pre-fetch quota. "Pre-fetching" is a type of DMA fetching operation where DMA descriptors are fetched for queued commands (commands that are not yet active).

Quota management unit 414 can maintain other restrictions or quotas that can further restrict fetching and pre-fetching of DMA descriptors. As discussed above, front end 108 can receive commands over a plurality of ports. In an embodiment, quota management unit 414 can further subject fetching and pre-fetching operations to a maximum number of DMA descriptor fetch operations per port of the plurality of ports. In an embodiment, quota management unit 414 can further subject fetching and pre-fetching operations to a maximum number of DMA descriptor fetch operations per read command type and write command type. In an embodiment, front end 108 categorizes commands into a plurality of transfer sizes (e.g., read commands and large read commands, write commands and large write commands). Quota management unit 414 can further subject fetching and pre-fetching operations to a maximum number of DMA fetch operations per transfer size of the commands.

In an embodiment, quota management unit 414 can adjust the real-time fetch quota dynamically over time. For example, the write transfer controller 282 and the read transfer controller 280 can perform DMA transfers of clusters of data. Quota management unit 414 can adjust real-time fetch quota to maintain a descriptor capacity for a defined number of cluster transfers as DMA transfers are performed by back end 110. In an embodiment, active write commands have the highest priority. As such, in an embodiment, quota management unit 414 can communicate with write transfer controller 282 and re-evaluate the real-time fetch quota after one or more clusters have been transferred for active write commands.

In an embodiment, quota management unit 414 selects eligible command queues 231 from which to select commands for pre-fetching DMA descriptors. Descriptor fetch unit 412 can select commands for pre-fetching DMA descriptors from eligible commands queues according to a specified schedule, such as a round-robin schedule. Since write operations are performed sequentially, quota management unit 414 can set the pre-fetch quota to include a maximum number of DMA descriptors corresponding to a maximum number of queued write commands in the eligible command queues (e.g., four DMA descriptors for five queued write commands). Quota management unit 414 can keep track of active write commands and, after each write command completion, re-evaluate command queue eligibility. In an embodiment, read command queues are always eligible.

Descriptor fetch unit 412 determines the number of DMA descriptors to fetch from host system 102 for each selected command. In an embodiment, the number of DMA descriptors to be fetched is the smaller of: the number of free descriptor entries in the descriptor RAM; the number of DMA descriptors remaining in an SGL segment for the command; a number of DMA descriptors satisfying another quota (e.g., port quota, read/write quota, transfer size quota); and a number of DMA descriptors satisfying a respective one of the real-time fetch quota or the pre-fetch quota.

Figure 5:
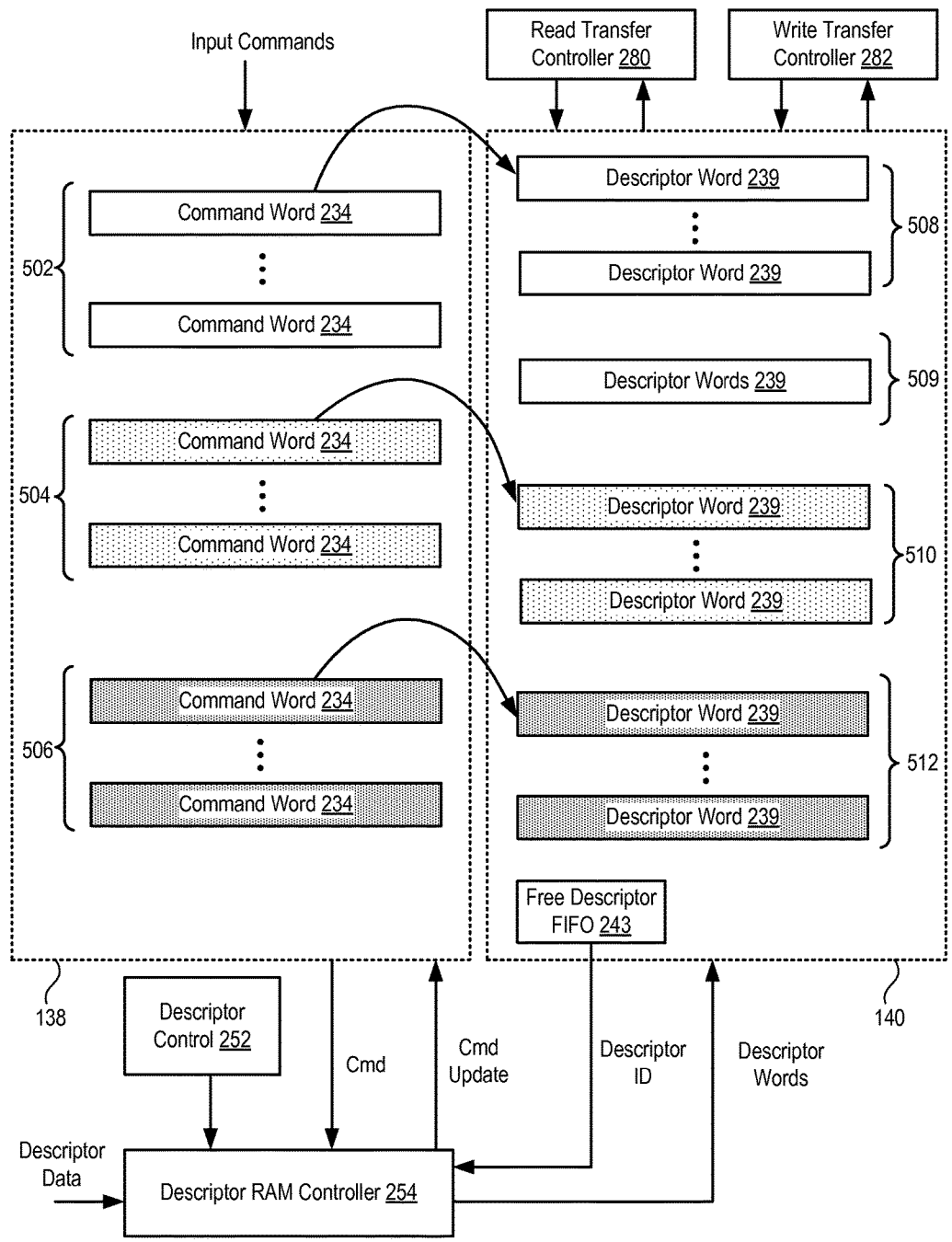
FIG. 5 is a block diagram illustrating an example of DMA descriptor management and control flow in the front end of FIG. 2.

FIG. 5 is a block diagram illustrating an example of DMA descriptor management and control flow in front end 108. As described above, input commands are stored in command RAM 138. In the example, command RAM 138 stores queued commands 502, active read commands 504, and active write commands 506. Queued commands 502 include one or more commands stored in command queues 231 of front end 108 and waiting to be issued to back end 110 for processing. Active write commands 504 include one or more write commands that have been issued to back end 110 for processing. Active read commands 506 include one or more read commands that have been issued to back end 110 for processing.

Descriptor control unit 252 selects commands in command RAM 138 for which to obtain DMA descriptors, as described above. Descriptor RAM controller 254 receives descriptor data comprising fetched DMA descriptors for commands selected by descriptor control unit 252. Descriptor RAM controller 254 updates the commands in command RAM 138 according to the received DMA descriptors. For example, descriptor RAM controller 254 updates SGL data in command data 302, updates data descriptor head pointer 304, updates meta data descriptor head pointer 306, updates descriptor tail pointer 308, or a combination thereof. If the fetched DMA descriptors are the first DMA descriptors for a given command, descriptor RAM controller 254 obtains a new descriptor ID from free descriptor FIFO 243. Descriptor RAM controller 254 stores the DMA descriptors in descriptor RAM 140 for the commands.

In the example shown, descriptor RAM 140 stores a list 508 of DMA descriptor words 239 for a command in queued commands 502. A command word 234 for the command has pointers defining list 508. Descriptor RAM 140 stores a list 510 of DMA descriptor words 239 for a command in active write commands 504. A command word 234 for the command has pointers defining list 510. Descriptor RAM 140 stores a list 512 of DMA descriptor words 239 for a command in active read commands 406. A command word 234 for the command has pointers defining list 512. Descriptor RAM 140 also has a group 509 of free descriptor words. Read transfer controller 280 and write transfer controller 282 can obtain or access descriptor lists in descriptor RAM 140 to perform DMA transfer operations for active commands.

Figure 6:
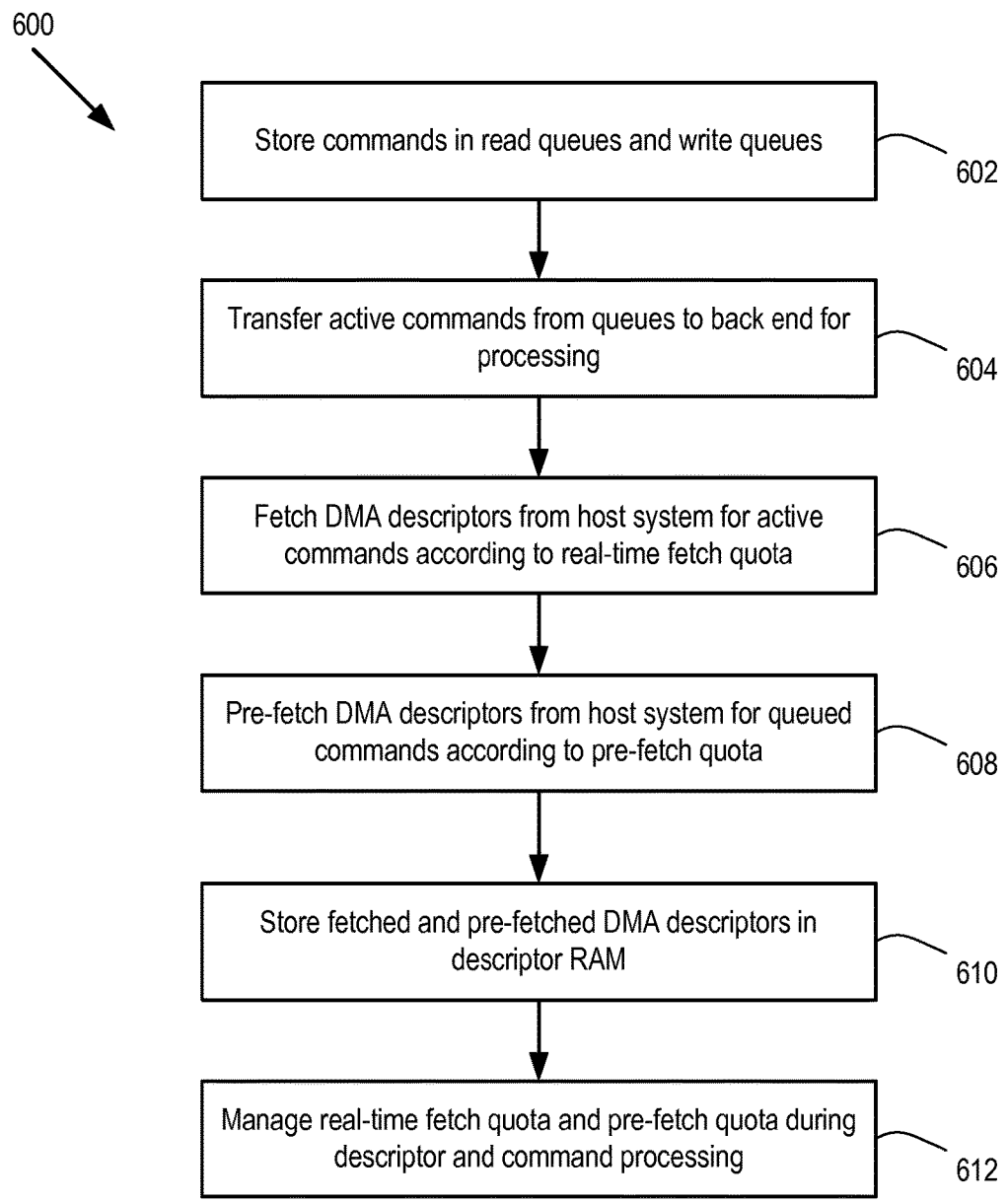
FIG. 6 is a flow diagram depicting a method of fetching DMA descriptors for commands to a non-volatile storage device according to an embodiment.

FIG. 6 is a flow diagram depicting a method 600 of fetching DMA descriptors for commands to a non-volatile storage device according to an embodiment. Method 600 can be performed by front end 108 of SSD controller 105 discussed above. Method 600 begins at operation 602, wherein front end 108 stores commands (e.g., read commands and write commands) in command queues. At operation 604, front end 108 transfers active commands from queues to back end 110 for processing. At operation 606, front end 108 fetches DMA descriptors from host system 102 for active commands according to a real-time fetch quota. At operation 608, front end 108 pre-fetches DMA descriptors from host system for queued commands according to a pre-fetch quota. At operation 610, front end 108 stores fetched and pre-fetched DMA descriptors in descriptor RAM 140. At operation 612, front end 108 manages the real-time fetch quota and the pre-fetch quota during descriptor and command processing. For example, front end 108 can dynamically adjust real-time fetch quota as DMA transfers are performed.

Figure 7:
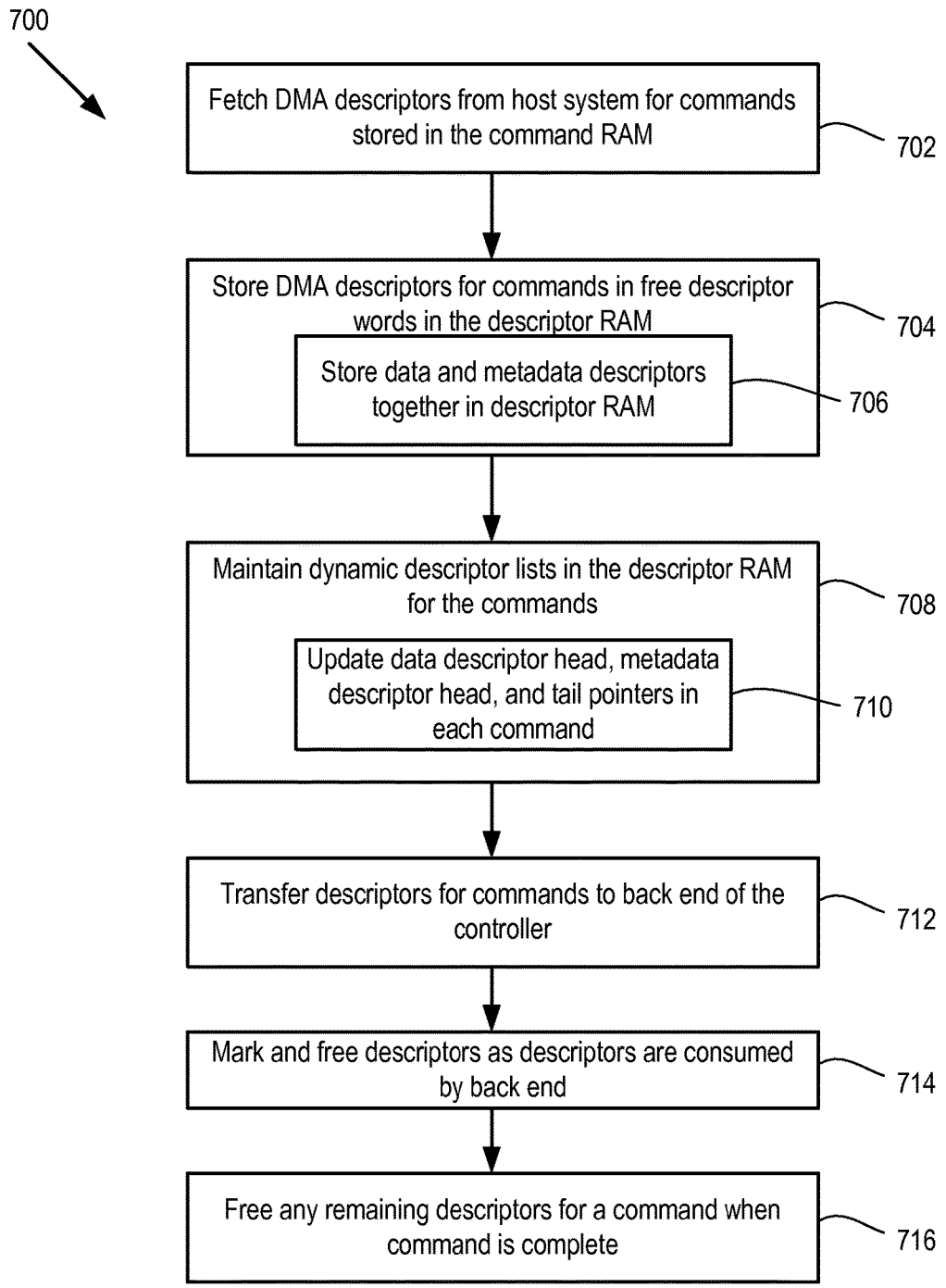
FIG. 7 is a flow diagram depicting a method of managing DMA descriptors for commands to a non-volatile storage device according to an embodiment.

FIG. 7 is a flow diagram depicting a method 700 of managing DMA descriptors for commands to a non-volatile storage device according to an embodiment. Method 700 can be performed by front end 108 of SSD controller 105 discussed above. Method 700 begins at operation 702, where front end 108 fetches DMA descriptors from host system 102 for commands stored in command RAM 138. In an embodiment, operation 702 can perform method 600 of FIG. 6. At operation 704, front end 108 stores DMA descriptors for commands in free descriptor words 239 in descriptor RAM 140. Operation 704 can include an operation 706, where front end 108 stores data and metadata descriptors together in descriptor RAM 140.

At operation 708, front end 108 maintains dynamic descriptor lists in descriptor RAM 140 for the commands. Operation 708 can include an operation 710, where front end 108 updates data descriptor head, metadata descriptor head, and tail pointers in each command. At operation 712, front end 108 transfers descriptors for commands to back end 110. At operation 714, front end 108 marks and frees descriptor words in descriptor RAM 140 as descriptors are consumed by back end 110. At operation 716, front end 108 frees any remaining descriptor words in descriptor RAM 140 for a command when the command is complete.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

We claim:

1. A method of fetching direct memory access (DMA) descriptors for commands to a non-volatile semiconductor storage device, the method comprising:
storing the commands among a plurality of queues in a command random access memory (RAM);
processing one or more of the commands from the plurality of queues and issuing requests to read from or write into the non-volatile semiconductor storage device according to the processing;
fetching DMA descriptors from the host system for the processed commands according to a real-time fetch quota;
pre-fetching DMA descriptors from the host system for queued commands that are not being processed according to a pre-fetch quota; and
storing fetched and pre-fetched DMA descriptors in a descriptor RAM.

2. The method of claim 1, wherein the commands are received from a plurality of ports, and wherein the operations of fetching and pre-fetching are further subject to a maximum number of DMA descriptor fetch operations per port of the plurality of ports.

3. The method of claim 1, wherein the commands include read commands and write commands, and wherein the operations of fetching and pre-fetching are further subject to a maximum number of DMA descriptor fetch operations per read command type and write command type.

4. The method of claim 1, wherein the commands are categorized into a plurality of transfer sizes, and wherein the operations of fetching and pre-fetching are further subject to a maximum number of DMA descriptor fetch operations per transfer size of the commands.

5. The method of claim 1, further comprising:
adjusting the real-time fetch quota to maintain a descriptor capacity for a defined number of cluster transfers as DMA transfers are performed by a back end.

6. The method of claim 1, wherein the pre-fetch quota includes a maximum number of DMA descriptors corresponding to a maximum number of queued write commands in the plurality of queues.

7. The method of claim 1, wherein the DMA descriptors comprise data DMA descriptors and metadata DMA descriptors.

8. The method of claim 1, wherein the DMA descriptors are stored by the host system in scatter-gather list (SGL) segments.

9. The method of claim 1, wherein for each command of the processed commands for which DMA descriptors are fetched, and each command of the queued commands for which DMA descriptors are pre-fetched, the number of DMA descriptors fetched is the smaller of: the number of free descriptor entries in the descriptor RAM;
the number of DMA descriptors remaining in a scatter-gather list (SGL) segment for the command; a number of DMA descriptors satisfying at least one of a port quota, a command type quota, or a command size quota; and a number of DMA descriptors satisfying a respective one of the real-time fetch quota or the pre-fetch quota.

10. The method of claim 1, further comprising:
maintaining a linked list of DMA descriptor words in the descriptor RAM for each of the commands for which DMA descriptors have been fetched or pre-fetched.

11. A controller for a non-volatile semiconductor storage device, comprising:
a command random access memory (RAM) configured to store commands received from a host system;
a descriptor RAM; and
a processing system having a back end and a front end, the front end configured to:
store the commands among a plurality of queues in a command random access memory (RAM);
process one or more of the commands from the plurality of queues and issue requests to read from or write into the non-volatile semiconductor storage device according to the processing;
fetch DMA descriptors from the host system for the processed commands according to a real-time fetch quota;
pre-fetch DMA descriptors from the host system for queued commands that are not being processed according to a pre-fetch quota; and
store fetched and pre-fetched DMA descriptors in the descriptor RAM.

12. The controller of claim 11, wherein the front end comprises a data transfer unit configured to receive the commands from the host system and to request and receive the DMA descriptors from the host system.

13. The controller of claim 11, wherein the back end includes a DMA transfer controller configured to consume the DMA descriptors in the descriptor RAM in response to performing commands in the command RAM.

14. The controller of claim 11, wherein the front end is configured to receive the commands from a plurality of ports, and wherein the operations of fetching and pre-fetching performed by the front end are further subject to a maximum number of DMA descriptor fetch operations per port of the plurality of ports.

15. The controller of claim 11, wherein the commands include read commands and write commands, and wherein the operations of fetching and pre-fetching performed by the front end are further subject to a maximum number of DMA descriptor fetch operations per read command type and write command type.

16. The controller of claim 11, wherein the commands are categorized into a plurality of transfer sizes, and wherein the operations of fetching and pre-fetching performed by the front end are further subject to a maximum number of DMA descriptor fetch operations per transfer size of the commands.

17. The controller of claim 11, wherein the DMA descriptors comprise data DMA descriptors and metadata DMA descriptors.

18. The controller of claim 11, wherein the DMA descriptors are stored by the host system in scatter-gather list (SGL) segments.

19. The controller of claim 11, wherein for each command of the processed commands for which DMA descriptors fetched by the front end, and each command of the queued commands for which DMA descriptors pre-fetched by the front end, the number of DMA descriptors fetched is the smaller of: the number of free descriptor entries in the descriptor RAM; the number of DMA descriptors remaining in a descriptor segment for the command; a number of DMA descriptors satisfying at least one of a port quota, a command type quota, or a command size quota; and a number of DMA descriptors satisfying a respective one of the real-time fetch quota or the pre-fetch quota.

20. A non-transitory computer readable medium having stored thereon instructions that when executed by a processor cause the processor to perform a method of fetching direct memory access (DMA) descriptors for commands to a non-volatile semiconductor storage device, the method comprising:

storing the commands among a plurality of queues in a command random access memory (RAM);

processing one or more of the commands from the plurality of queues and issuing requests to read from or write into the non-volatile semiconductor storage device according to the processing;

fetching DMA descriptors from the host system for the processed commands according to a real-time fetch quota;

pre-fetching DMA descriptors from the host system for queued commands that are not being processed according to a pre-fetch quota; and storing fetched and pre-fetched DMA descriptors in a descriptor RAM.

\* \* \* \* \*